United States Patent
Gaffield et al.

(10) Patent No.: US 7,124,748 B2
(45) Date of Patent: Oct. 24, 2006

(54) FUEL DELIVERY ASSEMBLY FOR DUAL LOBE FUEL TANK

(75) Inventors: John T. Gaffield, Ann Arbor, MI (US); Daven C. Bhavsar, Canton, MI (US); Rafat Mohammad, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 174 days.

(21) Appl. No.: 11/013,957

(22) Filed: Dec. 16, 2004

(65) Prior Publication Data
US 2006/0130815 A1 Jun. 22, 2006

(51) Int. Cl.
*F02M 37/04* (2006.01)
(52) U.S. Cl. ....................................... 123/509
(58) Field of Classification Search .................. 123/509
See application file for complete search history.

(56) References Cited

U.S. PATENT DOCUMENTS

| | | | |
|---|---|---|---|
| 4,590,964 A | 5/1986 | Beardmore | |
| 4,651,701 A | 3/1987 | Weaver | |
| 4,672,937 A | 6/1987 | Fales et al. | |
| 4,706,707 A | 11/1987 | Betterton et al. | |
| 4,790,185 A | 12/1988 | Fedelem et al. | |
| 4,841,771 A | 6/1989 | Glover et al. | |
| 4,869,225 A | 9/1989 | Nagata et al. | |
| 4,945,884 A | 8/1990 | Coha et al. | |
| 5,038,741 A | 8/1991 | Tuckey | |
| 5,040,516 A | 8/1991 | Haraguchi | |
| 5,329,899 A | 7/1994 | Sawert et al. | |
| 5,642,719 A | 7/1997 | Brown | |
| 5,762,049 A | 6/1998 | Jones et al. | |
| 6,149,399 A | 11/2000 | Bowser et al. | |
| 6,152,174 A | 11/2000 | Hein | |
| 6,253,738 B1 * | 7/2001 | Takahashi et al. | 123/509 |
| 6,260,543 B1 | 7/2001 | Chih | |
| 6,371,153 B1 | 4/2002 | Fischerkeller et al. | |
| 6,435,163 B1 | 8/2002 | Fauser et al. | |
| 6,450,150 B1 | 9/2002 | Sanden et al. | |
| 6,532,941 B1 | 3/2003 | Begley et al. | |
| 6,553,973 B1 | 4/2003 | Coha et al. | |
| 6,634,341 B1 * | 10/2003 | Crary et al. | 123/516 |
| 6,752,129 B1 * | 6/2004 | Isozaki et al. | 123/509 |
| 6,783,336 B1 * | 8/2004 | Kempfer et al. | 417/423.1 |
| 6,886,542 B1 * | 5/2005 | Yamada et al. | 123/509 |
| 6,923,164 B1 * | 8/2005 | Mitsudou et al. | 123/509 |
| 2002/0119056 A1 | 8/2002 | Appleton et al. | |
| 2003/0084884 A1 | 5/2003 | Sawert et al. | |
| 2004/0163630 A1 | 8/2004 | Powell | |

* cited by examiner

*Primary Examiner*—Thomas Moulis
(74) *Attorney, Agent, or Firm*—Brinks Hofer Gilson & Lione

(57) ABSTRACT

A fuel delivery assembly for a dual lobe fuel tank. The assembly comprises a flange for disposing the assembly within the fuel tank. The flange has outer and inner surfaces. The inner surface has a collar extending therefrom. The collar has radial slots formed thereon. The assembly further comprises a bracket portion being compressible and cooperable with the collar for compression of the assembly. The bracket portion has tabs extending therefrom and is configured to be disposed in the collar. The tabs are received in the radial slots. The assembly further comprises a feed port connected to the bracket portion for fuel supply.

24 Claims, 8 Drawing Sheets

FUEL DELIVERY ASSEMBLY FOR DUAL LOBE FUEL TANK

BACKGROUND OF THE INVENTION

Vehicle fuel tanks are common and typically vary in design based on the vehicle make and model. Dual lobe fuel tanks, for example, are implemented in a vehicle wherein clearance is needed to allow the drivetrain and/or exhaust system to pass underneath the fuel tank. The clearance formed for the drivetrain and/or exhaust system defines at least two lobes within the tank. Typically, the two lobes are termed remote and active sides. Most dual lobe fuel tanks include a fuel delivery system in the remote side and a fuel pump system in the active side to pump fuel to the engine. The fuel delivery system may be in fluid communication with the fuel pump system via an internal fuel line.

Although common, vehicle dual lobe fuel tanks and dual lobe fuel tank systems are continually being improved due to the demands for improvements, e.g., permeability, weight, performance and accuracy. For example, manufacturers of dual lobe fuel tanks are challenged in providing a fuel delivery system that may be installed in various-sized dual lobe fuel tanks without compromising time, ease, and costs. Some fuel delivery units have two or more columns with a number of components that create an obstacle during installment of the unit in a fuel tank. That is, these current fuel delivery units create a challenge during installation where adjustments to the system are needed for an acceptable installment.

Thus, there is a need to provide an improved fuel delivery system that may be installed in various-sized dual lobe fuel tanks with relatively ease and within a relatively efficient time.

BRIEF SUMMARY OF THE INVENTION

The present invention generally provides an improved fuel delivery assembly that may be installed in various-sized dual lobe fuel tanks with relative ease and within a relatively efficient time. Embodiments of the present invention allow for more versatile use within fuel tanks and improve efficiency in manufacturing, assembly, and installation without compromising durability.

In one embodiment, the present invention provides a fuel delivery assembly for a dual lobe fuel tank. The assembly comprises a flange for disposing the assembly within the fuel tank. The flange has outer and inner surfaces. The inner surface has a collar extending therefrom. The collar has radial slots formed thereon. The assembly further comprises a bracket portion which is compressible and cooperable with the collar for compression of the assembly. The bracket portion has tabs extending therefrom and is configured to be disposed in the collar. The tabs are received in the radial slots. The assembly further comprises a feed port connected to the bracket portion for fuel supply.

In another embodiment, the bracket portion includes upper and lower brackets. The upper bracket is cooperable with the collar. The upper bracket has ribs extending therefrom and is configured to be disposed in the collar. The ribs are received in the radial slots. The lower bracket is connected to and in biased relationship with the upper bracket for compression of the assembly.

Further objects, features, and advantages of the present invention will become apparent from consideration of the following description and the appended claims when taken in connection with the accompanying drawings.

BRIEF DESCRIPTION OF THE DRAWINGS

FIG. 2b is a side view of the fuel delivery assembly in FIG. 2a;

FIG. 2c is another side view of the fuel delivery assembly in FIG. 2a;

FIG. 3b is an enlarged view of circle B in FIG. 3a;

FIG. 7b is an end cross-sectional view of the feed port of FIG. 7a.

DETAILED DESCRIPTION OF THE INVENTION

The present invention generally provides an improved fuel delivery assembly 10 or Remote Pickup Module (RPM) for a dual lobe fuel tank 12. The fuel delivery assembly 10 includes movable components that allow for quick, reliable, and easy placement of the assembly 10 within a fuel tank 12. The movable components may be a full 360 degrees to facilitate quick and easy installation within a fuel tank 12 without compromising reliability of performance.

Figure 1:
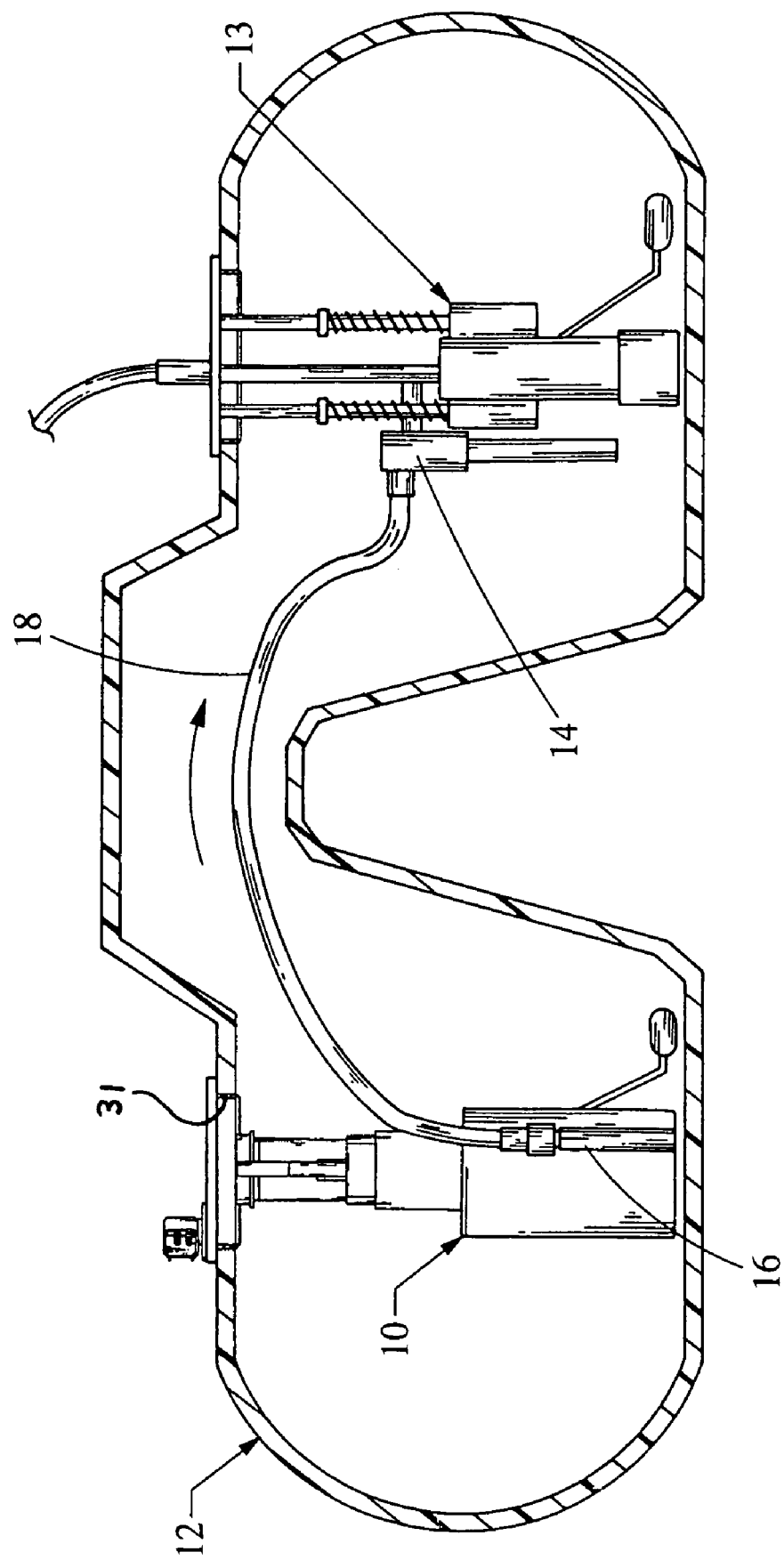
FIG. 1 is a side cross-sectional environmental view of a dual lobe fuel tank in which a fuel delivery assembly implemented in accordance with one embodiment of the present invention.

FIG. 1 illustrates a fuel delivery assembly 10 for a dual lobe fuel tank 12 in accordance with one embodiment of the present invention. Preferably, the fuel delivery assembly 10 is configured to facilitate the delivery of fuel from a remote side of the fuel tank 12 to an active side of the fuel tank 12. As shown, a fuel pump unit 13 including a jet pump 14 is located at the active side of the fuel tank 12 and pumps fuel from the remote side thereof via the fuel delivery assembly 10. In this embodiment, this is accomplished with a pickup port 16 of the fuel delivery assembly 10 being in fluid communication with the jet pump unit 14 via a feed line 18. The fuel is then pumped from the tank to the engine of the vehicle, via pump unit 13.

Figure 2A:
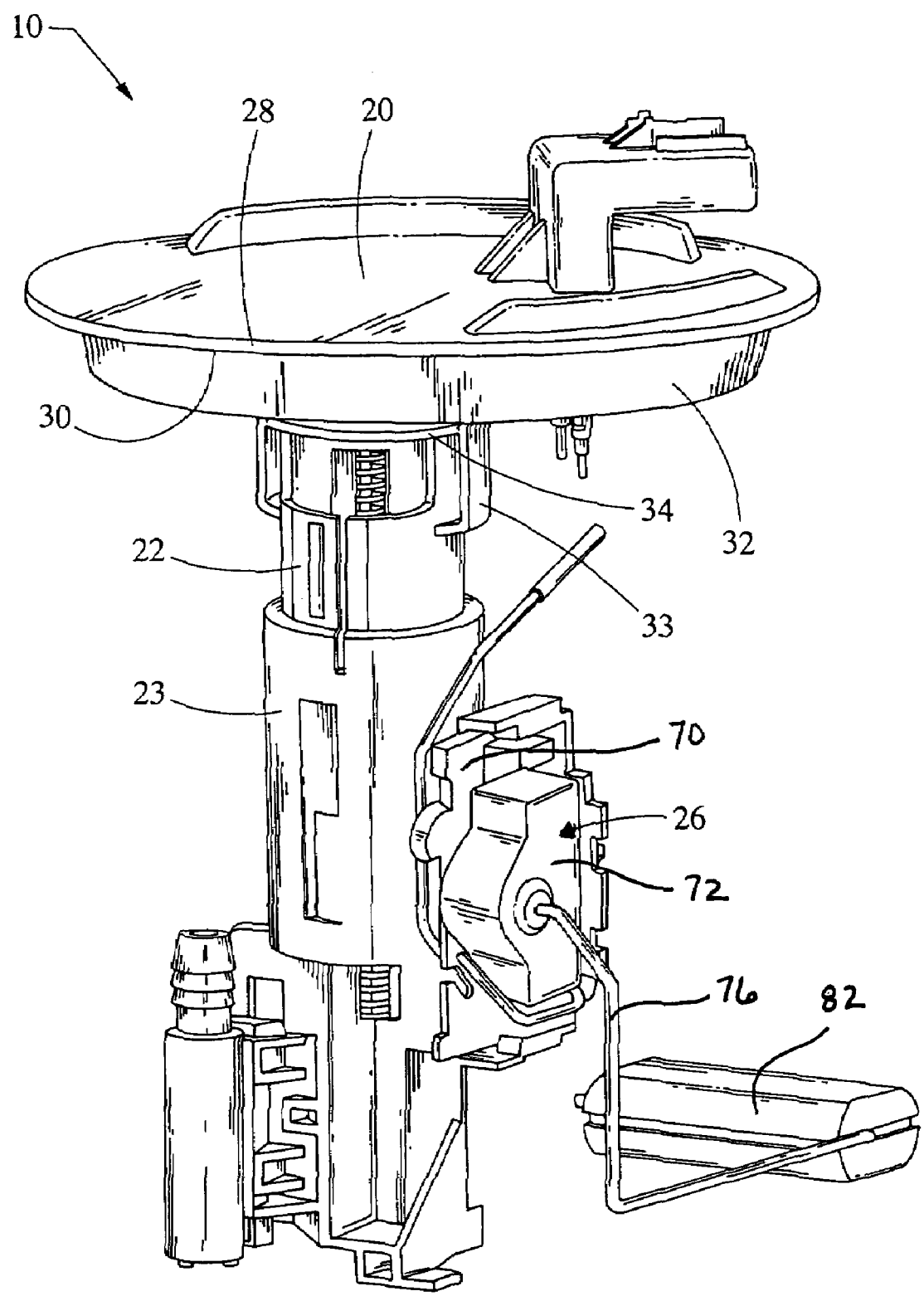
FIG. 2a is an elevated side view of the fuel delivery assembly in FIG. 1.
Figure 2B:
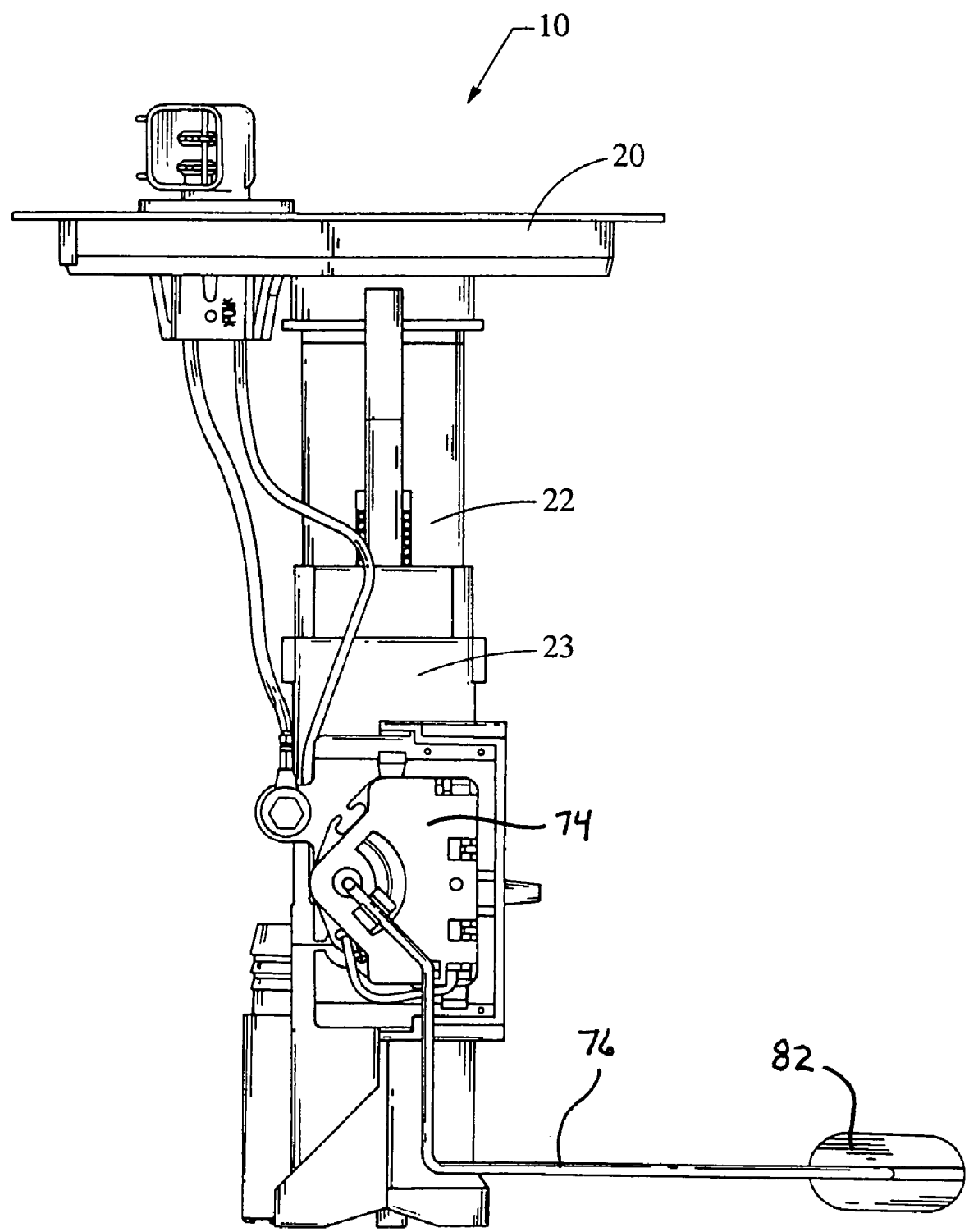
Figure 2C:
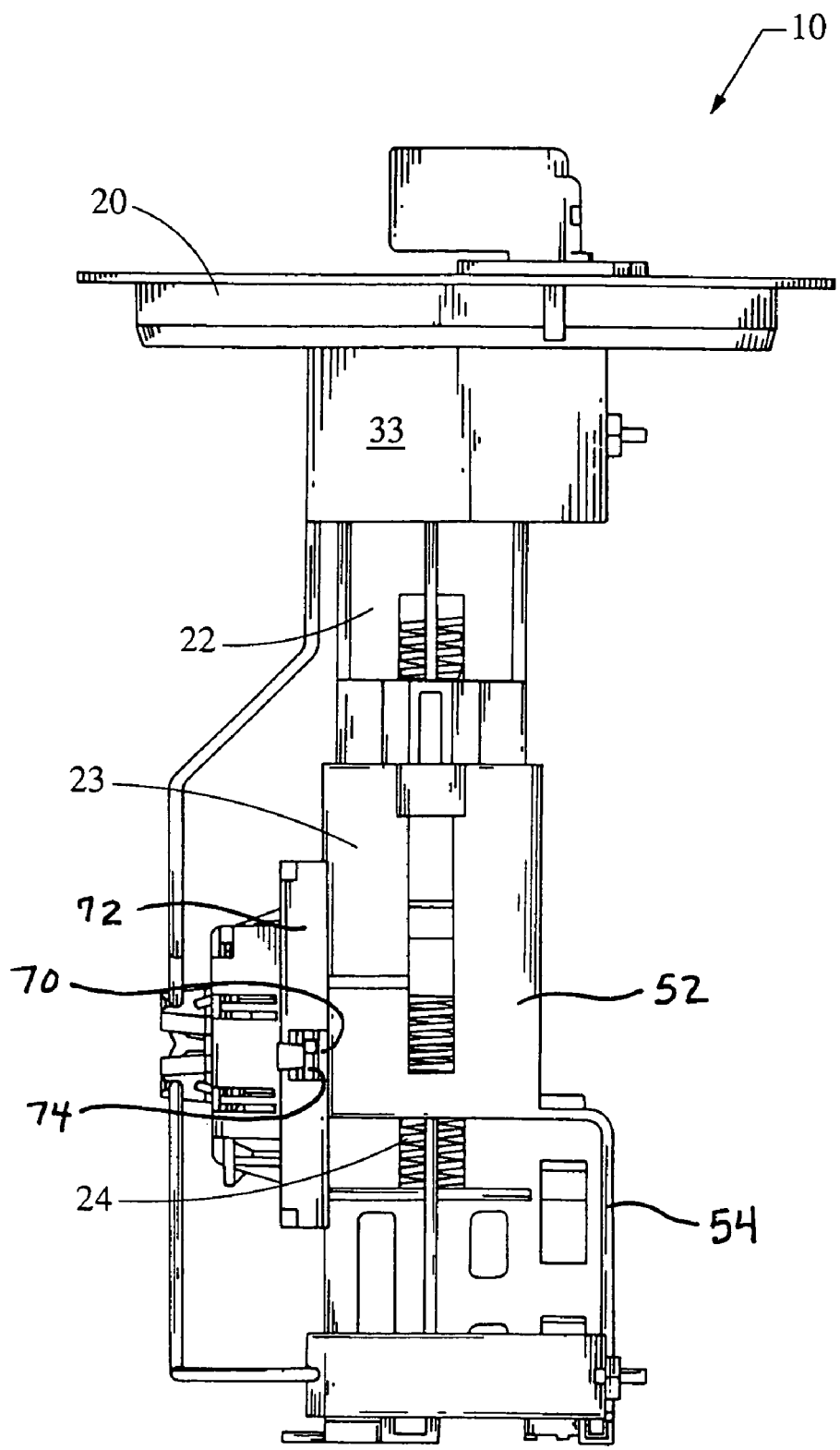

As shown in FIGS. 2a–2c, the assembly 10 generally includes a flange 20, an upper bracket 22 connected to the flange 20, a lower bracket 23 and a spring 24 in biased relationship with the upper bracket 22, a sender unit 26 mounted to the lower bracket 23 for fuel level sensing, and a feed port 16 connected to the lower bracket 23 for fuel delivery to the fuel pump unit 13. As discussed in greater detail below, the assembly 10 includes components that cooperate together to allow the assembly 10 to be rotatable within the fuel tank 12 during installation of the assembly 10 in the fuel tank 12. As a result, the installation of the assembly 10 in a fuel tank 12 is easier and faster, while maintaining durability and reliable performance of the assembly 10.

As shown, the assembly 10 includes a flange 20 for disposing the assembly 10 within the fuel tank 12. The flange 20 has an outer surface 28 and an inner surface 30. Preferably, as shown in FIG. 1, the flange 20 is mounted within an aperture 31 of the fuel tank 12 such that the assembly 10 may be disposed within the fuel tank 12. In this embodiment, the flange 20 has a radial lip 32 (FIGS. 2a–2c) that engages the outer surface 28 of the fuel tank 12 to maintain placement of the flange 20 within the aperture 31. Thus, the outer surface 28 is located outside of the fuel tank 12 and the inner surface 30 is located inside of the fuel tank 12.

Figure 3A:
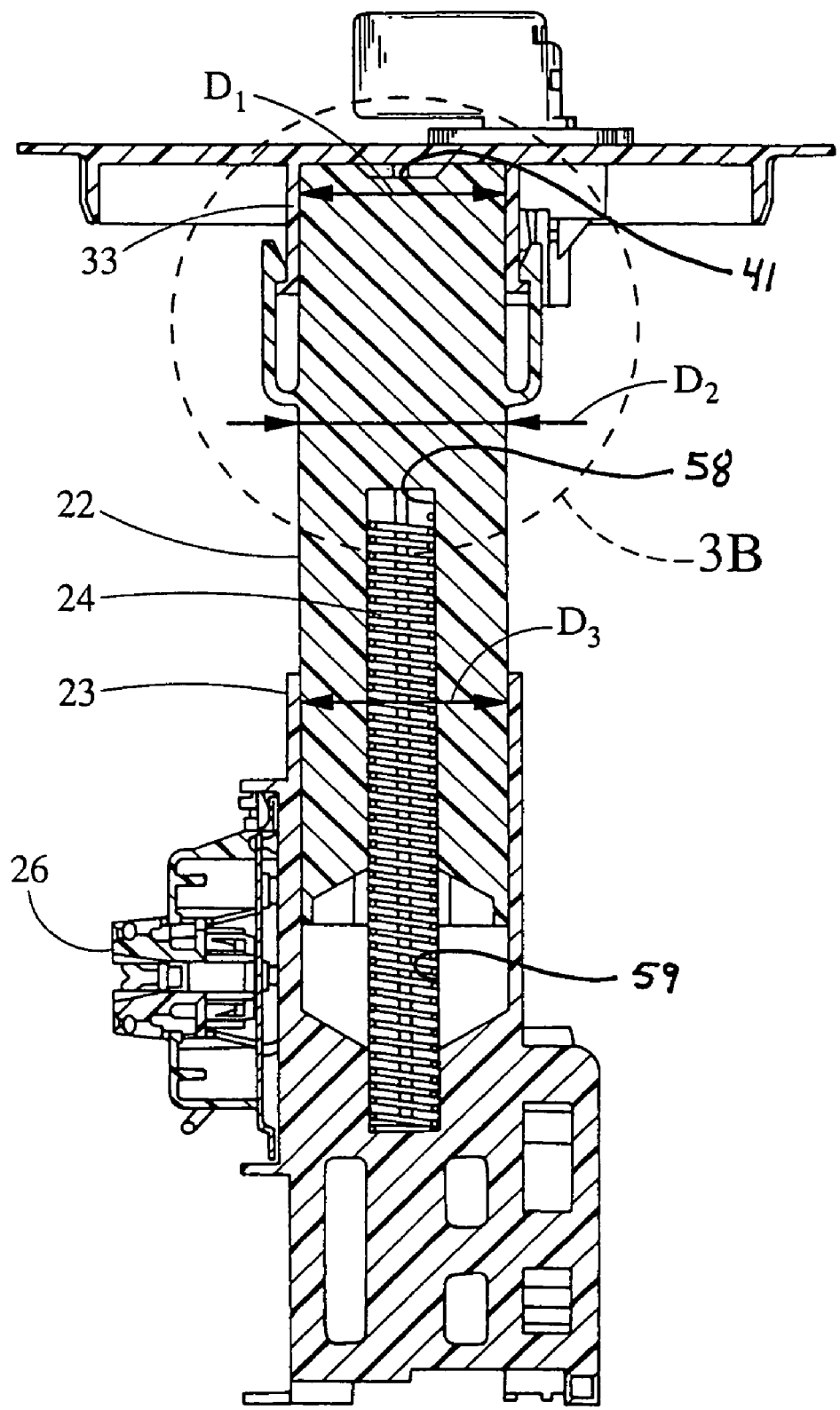
FIG. 3a is a side cross-sectional view of the fuel delivery assembly in FIG. 2b taken along line A—A.
Figure 3B:
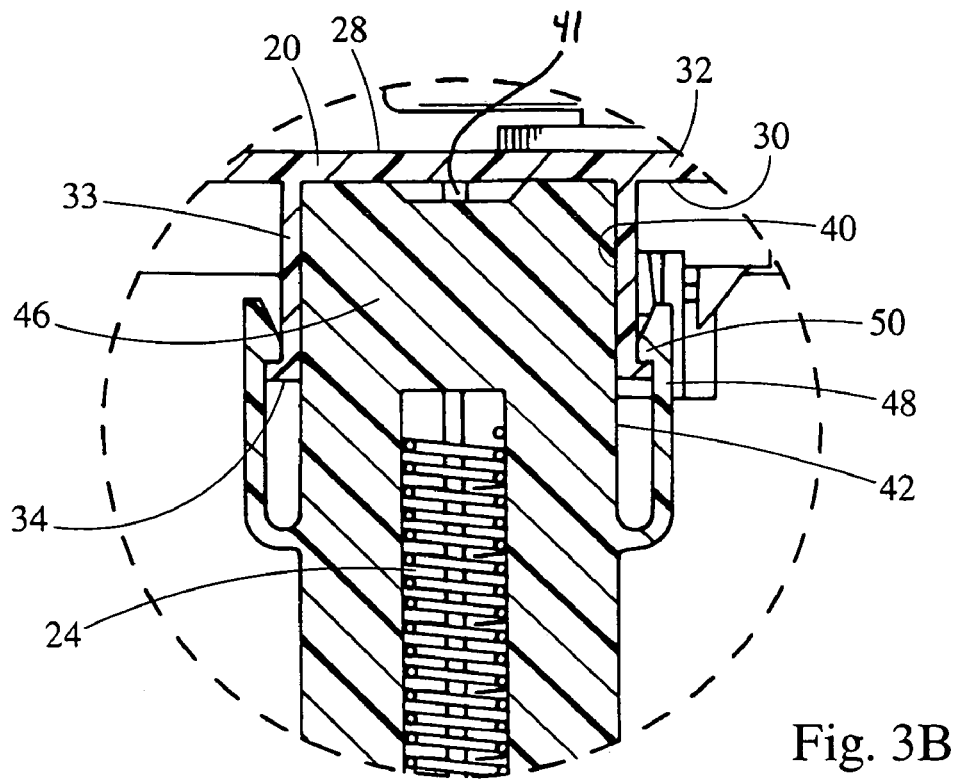
Figure 4:
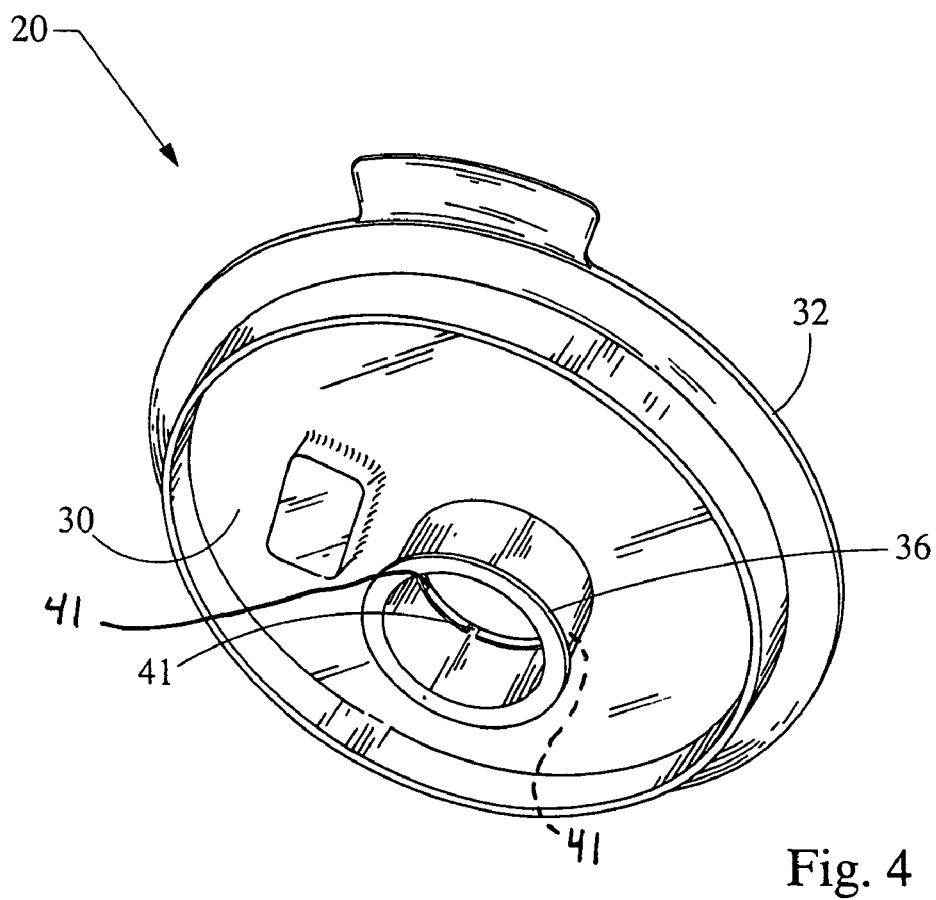
FIG. 4 is an elevated view of a flange of the assembly.

As shown in FIGS. 3a through 4, the inner surface 30 of the flange 20 preferably has a collar 33 or sleeve extending therefrom to a receiving end 34. The receiving end 34 has a lip formed thereabout. As shown, the collar 33 includes an inner wall 40 having an inner diameter $D_1$. Preferably, the collar 33 has radial slots 41 formed about the inner wall 40. In this embodiment, the radial slots 41 are formed adjacent the inner surface 30 of the flange 20 and at about 45 degree segments apart from each other. The flange 20 may be made of any suitable material, preferably polymeric material, e.g., high density polyethylene.

Figure 5:
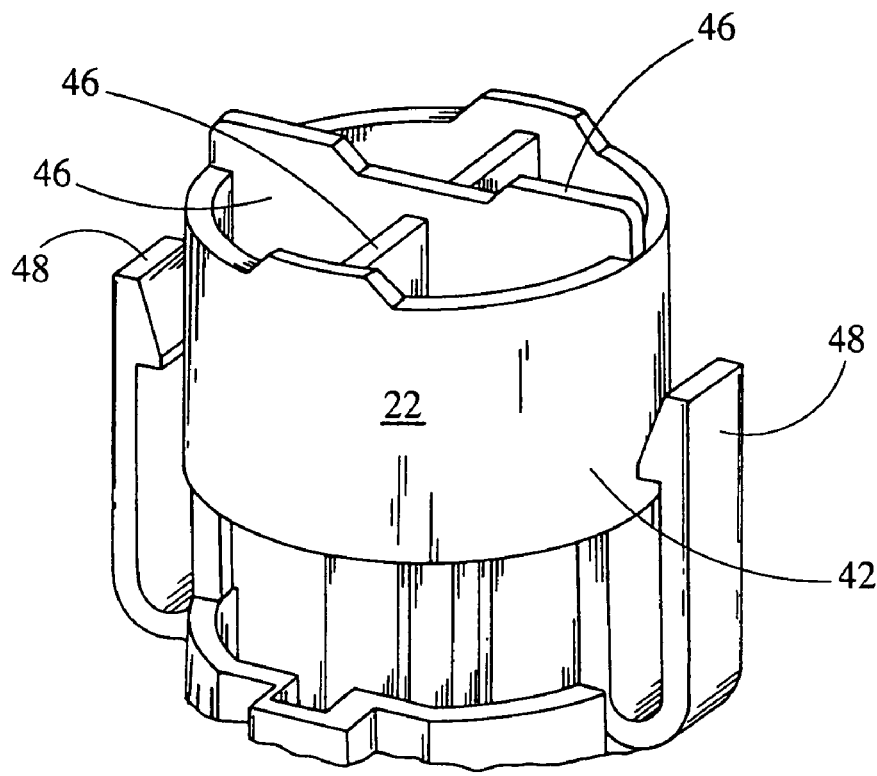
FIG. 5 is an elevated view of an upper bracket of the assembly.

FIGS. 3a–3b and 5 depict the upper bracket 22 having a first end 42 connected to the flange 20 and a second end 44 to which the lower bracket 23 connects. As shown, the upper bracket 22 includes at least one flat rib 46 for providing support to the upper bracket 22. In this embodiment, the upper bracket 22 includes two flat ribs 46 in normal relationship with each other. The flat ribs 46 longitudinally extend within the upper bracket 22 and extend through the first end 42. The upper bracket 22 further includes opposing side tabs 48 extending therefrom and toward the collar 33. As discussed below, the side tabs 48 are configured to engage the lip of the collar 33 for securement.

As shown in FIGS. 2a–3b, the upper bracket 22 cooperates with the collar 33 to attach thereto. In this embodiment, the first end 42 of the upper bracket 22 is configured to be disposed in the collar 33. Preferably, each of the ends of the flat ribs 46 is received in one of the radial slots 41 of the collar 33. In this embodiment, the configuration of the radial slots 41 and the flat ribs 46 is arranged such that the upper bracket 22 may be rotated about 360 degrees at about 45 degree increments for ease during installation of the assembly 10 in a fuel tank 12. The outer diameter $D_2$ of the upper bracket 22 is able to be inserted in the inner diameter $D_1$ of the collar 33, since the outer diameter $D_2$ is slightly less than the inner diameter $D_1$.

As shown in FIGS. 3a–3b and 5, the side tabs 48 are configured to engage the lip of the collar 33 for securement. As shown, each side tab has a tapered engagement member 50 formed to receive the lip of the collar 33. The end of each tapered engagement member 50 engages the lip for securement of the upper bracket 22 in collar 33. Thus, as the end of the flat ribs 46 are inserted in the radial slots 41, the side tabs 48 engage the lip of the collar's 33 receiving end 34 for securement.

FIGS. 2a–3a illustrate that the lower bracket 23 is connected to the upper bracket 22. As shown, the lower bracket 23 includes a body portion 52 and a base portion 54 connected to the body portion 52. The body portion 52 cooperates with the upper bracket 22. The body portion 52 has an inner diameter $D_3$ that is slightly greater than the outer diameter $D_2$ of the upper bracket 22 to receive the upper bracket 22.

In this embodiment, the outer diameter of the upper bracket 22 is configured to insert into body portion 52 of the inner diameter of the collar 33 to facilitate cooperation between the upper bracket 22 and the collar 33. The upper bracket 22 and the lower bracket 23 may be secured or locked to each other by any suitable means. For example, the upper and lower brackets 22, 23 may include a tongue and groove configuration 56 with a clamp-fit or snap-fit for securement. As shown, the upper and lower brackets 22, 23 may be rotated 180 and 360 degrees to further facilitate easy and time effective installation of the assembly 10 in a fuel tank 12.

As shown, the lower bracket 23 is in biasing relationship with the upper bracket 22 for compression of the assembly 10. In this embodiment, the biasing relationship between the upper and lower brackets 22, 23 is accomplished with a single spring 24 member loaded between the upper and lower brackets 22, 23 as shown. The single spring 24 simplifies the total components use in the assembly 10 and further adds to the ease of installation thereof in a fuel tank 12.

In this embodiment, each of the upper and lower brackets 22, 23 has opposing slots 58, 59 in which the spring 24 is inserted to define a spring-loaded bracket portion 60. For example, the upper and lower brackets 22, 23 may be compressed or expanded depending on the size of the fuel tank 12 in which the assembly 10 is to be installed. In this example, the upper and lower brackets 22, 23 may be compressed beyond 30 millimeters from its original length to accommodate various-sized fuel tanks. Thus, the upper bracket 22 may be designed in various tank heights to allow for different tank depths.

Figure 6:
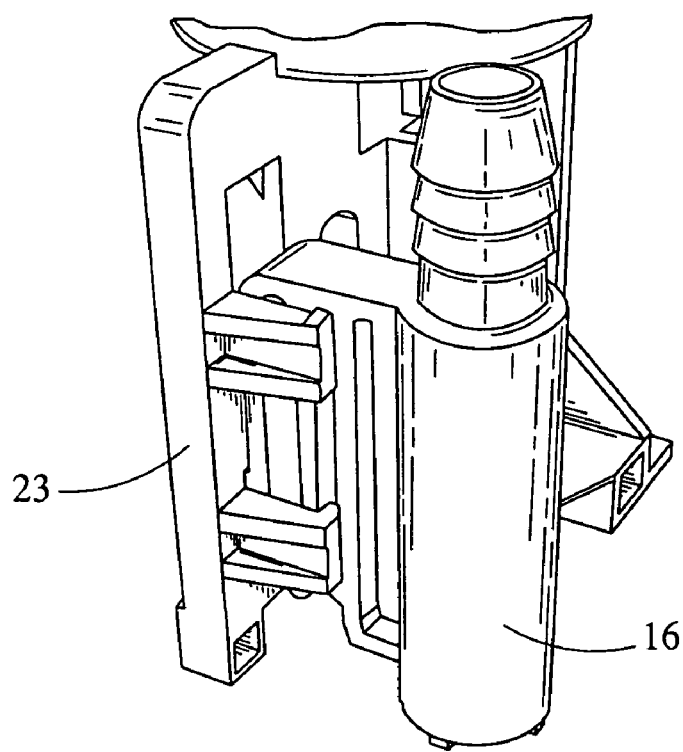
FIG. 6 is an elevated view of a lower bracket of the assembly.
Figure 7A:
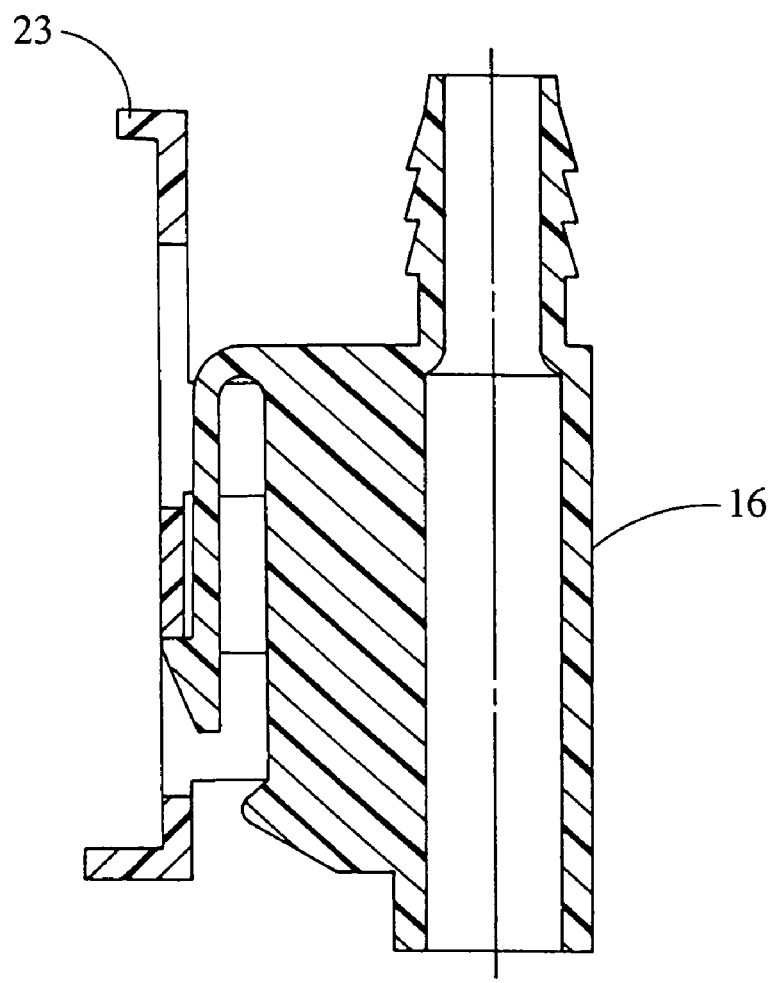
FIG. 7a is a side cross-sectional view of a feed port of the assembly.
Figure 7B:
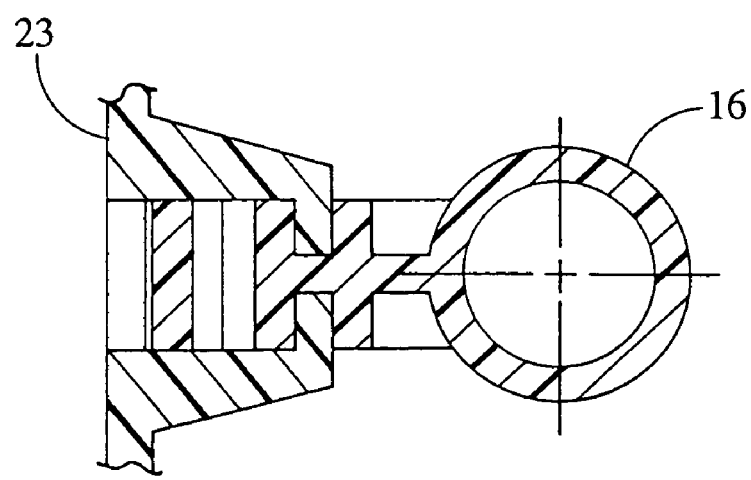

The base portion 54 is connected to the body portion 52 and is configured to engage the tank opposite the flange 20 for support. As shown in FIGS. 6–7b, the feed port 16 is attached to the base portion 54 of the lower bracket 23 for fuel supply. In this embodiment, fastener or snap fit of the feed port 16 includes an "H"-cross-section slot for engaging two double "L"-shaped fingers on a mating bracket to hold the feed port 16 in position. A separate snap feature on the feed port 16 is disposed within a hole used to create the lower double L-shaped fingers. An angled lead-in feature for the H-slot on the port prevents the port from being inserted into the channel with the snap tab. A window on the lower bracket 23 allows for snap tab to be pressed inward for port removal.

The feed port 16 is press fit to a cross over fuel line. The fuel line can be part of the inside of the fuel tank 12, if the manufacturing process allows it or if the line can be fed across from one side of the tank to the other. In this embodiment, the feed port 16 may be snapped into a lower bracket 23 on the assembly 10 prior to installation into the fuel tank 12.

The upper bracket 22 and the lower bracket 23 may be made of any suitable material, preferably polymeric material, e.g., high density polyethylene. Moreover, each of the flange 20 and upper and lower brackets 22, 23 may be made by any suitable means such as by die molding.

FIGS. 2a–3b further illustrate that the assembly 10 further includes a sender unit 26 attached to the lower bracket 23 for fuel level sensing. In this embodiment, the sender unit 26 includes a back plate 70 mounted to the lower bracket 23. As shown, a case 72 is attached to the back plate and a resistor card 74 is housed in the case. An electrical connector is attached to the resistor card for sending fuel level signals. Preferably, the sender unit 26 further includes a float arm 76 having first and second ends 78, 80. The first end 78 is pivotally attached to the case 72 and a float member 82 is attached to the second end 80 of the float arm 76. However, it is understood that any other suitable sender unit 26 may be used without falling beyond the scope or spirit of the present invention.

While the present invention has been described in terms of preferred embodiments, it will be understood, of course, that the invention is not limited thereto since modifications may be made to those skilled in the art, particularly in light of the foregoing teachings.

The invention claimed is:

1. A fuel delivery assembly for a dual lobe fuel tank, the assembly comprising:
    a flange for disposing the assembly within the fuel tank, the flange having outer and inner surfaces, the inner surface having a collar extending therefrom, the collar having radial slots formed thereon;
    a bracket portion being compressible and cooperable with the collar for compression of the assembly, the bracket portion having tabs extending therefrom and configured to be disposed in the collar, the tabs being received in the radial slots; and
    a feed port connected to the bracket portion for fuel supply.

2. The fuel delivery assembly of claim 1 wherein the bracket portion includes:
    an upper bracket cooperable with the collar, the upper bracket having ribs extending therefrom, the upper bracket being configured to be disposed in the collar and the ribs being received in the radial slots; and
    a lower bracket connected to and in biased relationship with the upper bracket for compression of the assembly.

3. The fuel delivery assembly of claim 1 further comprising:
    a sender unit attached to the lower bracket for fuel level sensing, the sender unit comprising:
        a back plate mounted to the lower bracket;
        a case attached to the back plate;
        a resistor card housed in the case;
        an electrical connector attached to the resistor card for sending fuel level signals;
        a float arm having first and second ends, the first end being pivotally attached to the case; and
        a float member attached to the second end of the float arm.

4. The fuel delivery assembly of claim 1 wherein the collar includes an inner wall having radial slots in about 45 degree increments.

5. The fuel delivery assembly of claim 1 wherein the collar includes a receiving end having a lip formed thereabout.

6. The fuel delivery assembly of claim 1 wherein the ribs longitudinally extend within the upper bracket for support thereof.

7. The fuel delivery assembly of claim 1 wherein the upper bracket further includes side tabs extending therefrom toward the collar, the side tabs being configured to engage the lip of the collar for securement.

8. The fuel delivery assembly of claim 1 wherein the outer diameter of the upper bracket is configured to insert into the inner diameter of the collar to facilitate cooperation between the upper bracket and the collar.

9. The fuel delivery assembly of claim 1 wherein the outer diameter of the upper bracket is insertable in the inner diameter of the lower bracket to facilitate a biased relationship between the upper and lower brackets.

10. The fuel delivery assembly of claim 1 wherein the lower bracket includes:
    a body portion cooperating with the upper bracket, the body portion having a diameter greater that the diameter of the upper bracket to receive the upper bracket; and
    a base portion connected to the body portion and configured to engage the tank, the feed port being attached to the base portion for support.

11. The fuel delivery assembly of claim 1 wherein the upper bracket and the lower bracket include a tongue and groove configuration for securement.

12. The fuel delivery assembly of claim 1 further comprising:
    a biasing member engaging the upper bracket and the lower bracket to facilitate compression and expansion of the assembly in the dual lobe fuel tank.

13. A fuel delivery assembly for a dual lobe fuel tank, the assembly comprising:
    a flange for disposing the assembly within the fuel tank, the flange having outer and inner surfaces, the inner surface having a collar extending therefrom, the collar having radial slots formed thereon;
    an upper bracket cooperable with the collar, the upper bracket having ribs extending therefrom, the upper bracket being configured to be disposed in the collar and the ribs being received in the radial slots;
    a lower bracket connected to and in biased relationship with the upper bracket for compression of the assembly; and
    a feed port connected to the lower bracket for fuel supply.

14. The fuel delivery assembly of claim 13 further comprising:
    a sender unit attached to the lower bracket for fuel level sensing, the sender unit comprising:
        a back plate mounted to the lower bracket;
        a case attached to the back plate;
        a resistor card housed in the case;
        an electrical connector attached to the resistor card for sending fuel level signals;
        a float arm having first and second ends, the first end being pivotally attached to the case; and
        a float member attached to the second end of the float arm.

15. The fuel delivery assembly of claim 13 wherein the collar includes an inner wall having radial slots in about 45 degree increments.

16. The fuel delivery assembly of claim 13 wherein the collar includes a receiving end having a lip formed thereabout.

17. The fuel delivery assembly of claim 13 wherein the ribs longitudinally extend within the upper bracket for support thereof.

18. The fuel delivery assembly of claim 13 wherein the upper bracket further includes side tabs extending therefrom toward the collar, the side tabs being configured to engage the lip of the collar for securement.

19. The fuel delivery assembly of claim 13 wherein the outer diameter of the upper bracket is configured to insert into the inner diameter of the collar to facilitate cooperation between the upper bracket and the collar.

20. The fuel delivery assembly of claim 13 wherein the outer diameter of the upper bracket is insertable in the inner diameter of the lower bracket to facilitate a biased relationship between the upper and lower brackets.

21. The fuel delivery assembly of claim 13 wherein the lower bracket includes:
    a body portion cooperating with the upper bracket, the body portion having a diameter greater that the diameter of the upper bracket to receive the upper bracket; and a base portion connected to the body portion and configured to engage the tank, the feed port being attached to the base portion for support.

22. The fuel delivery assembly of claim 13 wherein the upper bracket and the lower bracket include a tongue and groove configuration for securement.

23. The fuel delivery assembly of claim 13 further comprising:
   a biasing member engaging the upper bracket and the lower bracket to facilitate compression and expansion of the assembly in the dual lobe fuel tank.

24. A fuel tank system for a dual lobe fuel tank of a vehicle, the system comprising:
   a fuel delivery assembly comprising:
      a flange for disposing the assembly within the fuel tank, the flange having outer and inner surfaces, the inner surface having a collar extending therefrom, the collar having radial slots formed thereon;
      a bracket portion being compressible and cooperable with the collar for compression of the assembly, the bracket portion having tabs extending therefrom and configured to be disposed in the collar, the tabs being received in the radial slots; and
      a feed port connected to the bracket portion for fuel supply;
   a fuel pump unit in fluid communication with the fuel delivery system, the fuel pump unit including a jet pump for pumping fuel from the fuel delivery assembly and a feed pump for pumping fuel to the engine of the vehicle.

* * * * *